United States Patent
Khalaj Amineh et al.

(10) Patent No.: US 10,662,760 B2
(45) Date of Patent: May 26, 2020

(54) EDDY-CURRENT RESPONSES IN NESTED PIPES

(71) Applicant: Halliburton Energy Services, Inc., Houston, TX (US)

(72) Inventors: Reza Khalaj Amineh, Houston, TX (US); Burkay Donderici, Pittsford, NY (US); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/768,308

(22) PCT Filed: Dec. 9, 2015

(86) PCT No.: PCT/US2015/064590
§ 371 (c)(1),
(2) Date: Apr. 13, 2018

(87) PCT Pub. No.: WO2017/099735
PCT Pub. Date: Jun. 15, 2017

(65) Prior Publication Data
US 2018/0313207 A1 Nov. 1, 2018

(51) Int. Cl.
| | |
|---|---|
| *E21B 47/09* | (2012.01) |
| *G01V 3/22* | (2006.01) |
| *E21B 47/08* | (2012.01) |
| *E21B 47/12* | (2012.01) |
| *G01V 3/28* | (2006.01) |

(52) U.S. Cl.
CPC ........ *E21B 47/0905* (2013.01); *E21B 47/082* (2013.01); *E21B 47/122* (2013.01); *G01V 3/22* (2013.01); *G01V 3/28* (2013.01)

(58) Field of Classification Search
None
See application file for complete search history.

(56) References Cited

U.S. PATENT DOCUMENTS

| | | | |
|---|---|---|---|
| 2013/0226461 A1 | 8/2013 | Yu et al. | |
| 2015/0219601 A1* | 8/2015 | Davydov | ................ E21B 47/00 324/229 |
| 2015/0285057 A1 | 10/2015 | Donderici et al. | |
| 2016/0108704 A1* | 4/2016 | Samuel | ..................... E21B 7/04 702/6 |

OTHER PUBLICATIONS

"International Application Serial No. PCT/US2015/064590, International Search Report dated Sep. 7, 2016", 3 pgs.
"International Application Serial No. PCT/US2015/064590, Written Opinion dated Sep. 7, 2016", 10 pgs.

* cited by examiner

*Primary Examiner* — Jas A Sanghera
(74) *Attorney, Agent, or Firm* — Gilliam IP PLLC

(57) ABSTRACT

Described are systems, devices, and methods for processing Eddy-current response signals acquired in a set of multiple nested pipes, such as, e.g., nested casing strings within a completed wellbore. In various embodiments, time boundaries between time slots within the Eddy-current response signals are determined adaptively based on an input response signal specific to the nested pipes (e.g., one of the measured signals itself). Additional embodiments are disclosed.

20 Claims, 11 Drawing Sheets

EDDY-CURRENT RESPONSES IN NESTED PIPES

BACKGROUND

In oil and gas field operations, it is often useful to monitor the condition of the production and intermediate casing strings in a completed borehole, as corrosion of these components can hinder oil production by leaks and cross-flows, thereby rendering well operation inefficient. Since casing removal is both expensive and time-consuming, particularly in offshore platforms, it is desirable to analyze the casing condition in situ. A common technique to do so involves inducing Eddy currents in the casing strings and measuring the resulting electromagnetic response signals at various positions along the casing. Proper analysis of these signals facilitates determining dimensions (e.g., thickness) and/or material properties (e.g., electrical conductivity, magnetic permeability) of the casing strings, and can, for instance, reveal casing metal losses with high accuracy.

DETAILED DESCRIPTION

Figure 1:
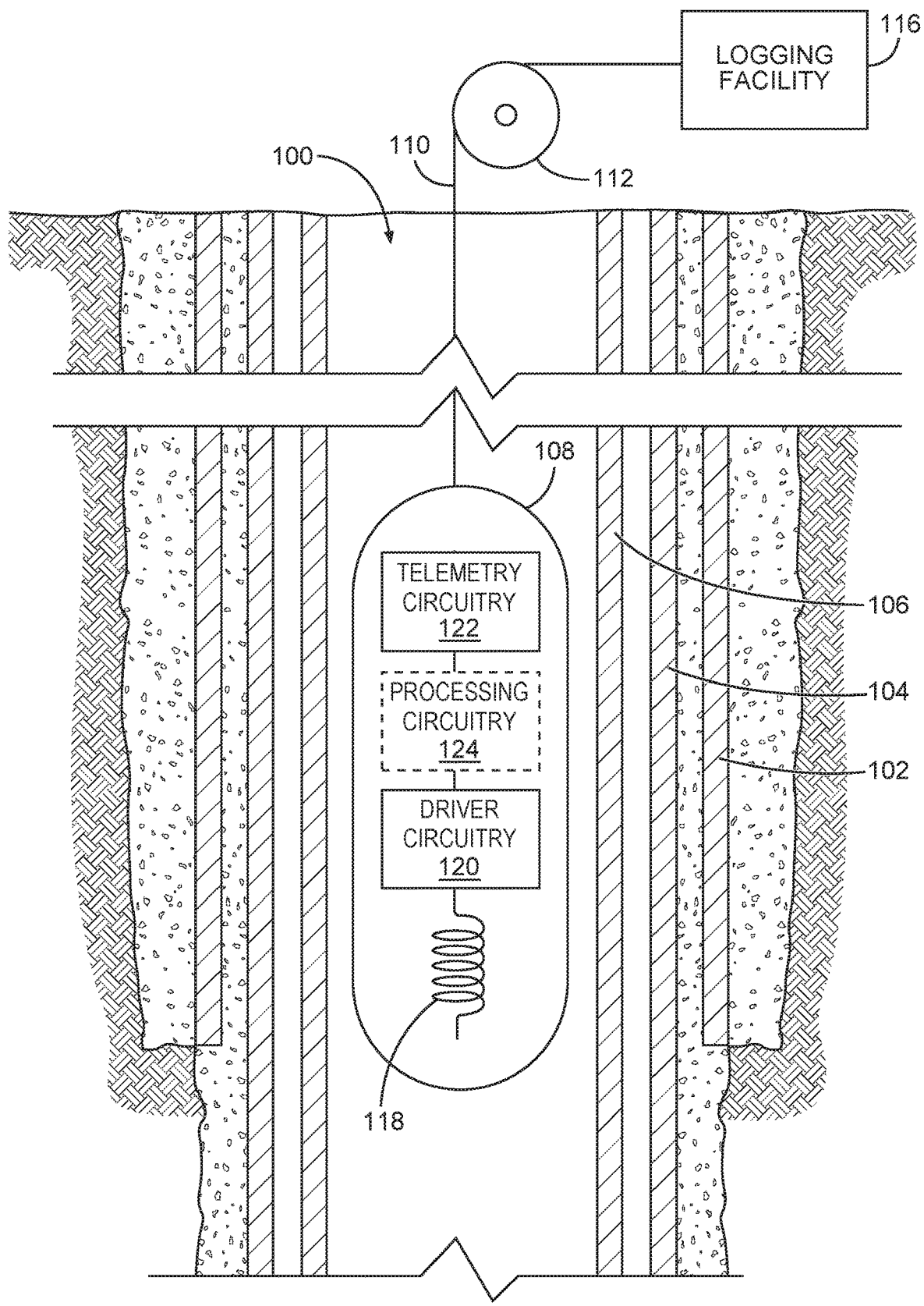
FIG. 1 is a diagram of an example wellbore environment in which Eddy-current techniques and tools in accordance with various embodiments may be used.

This disclosure relates generally to the processing of Eddy-current response signals acquired in a set of multiple nested pipes, such as, e.g., nested casing strings within a completed wellbore. When Eddy currents are used to inspect multiple nested (e.g., concentric) casing strings, the (dimensional and/or material) parameters of the different casing strings are generally derived from different portions of the response signal. For example, in pulsed Eddy-current (PEC) techniques, where the response signal is captured in the time domain, the signal is divided into consecutive time slots for the various nested casing strings, with the first time slot corresponding to the innermost casing string. The signal portions within these time slots may be analyzed separately to characterize the respective casing strings. Similarly, in frequency-domain-based techniques, the response signal may be partitioned into consecutive frequency slots that can be analyzed to estimate the parameters of respective casing strings, beginning with the innermost pipe for the highest-frequency slot. The accuracy with which the casing parameters are determined depends in part on the placement of the time or frequency boundaries between the slots, whose values are conventionally fixed at the outset.

The instant disclosure describes approaches for determining the boundaries between time or frequency slots within the Eddy-current response signals adaptively based at least in part on an input response signal that is specific to the configuration of nested pipes to be inspected. Instead of fixing the boundaries, the input response signal is processed (e.g., in one of several ways described below) to test a range of boundary values. In some embodiments, the input response signal is obtained by measurement. For example, one of the measured response signals to be analyzed to characterize the nested pipes (or a signal derived from one or more of the measured response signals, e.g., by interpolation) may itself serve as the input response signal for determining the boundaries. In alternative embodiments, the input response signal is obtained by simulation for a computational model of the nested pipes. The model may, for instance, be based on known nominal parameters of the pipes.

In accordance with various embodiments, one or more estimated parameters for each pipe (or at least one of the pipes) can be determined from the associated time or frequency slots using, e.g., a numerical-inversion technique in which the estimated parameters are iteratively adjusted and a response signal computed or otherwise determined based on the estimated parameter(s) is compared with the measured response signal (or a signal derived from measured response signals by, e.g., interpolation or extrapolation) until substantial agreement between the computed and measured response signals (as reflected in a difference between the two signals that falls below a specified consistency threshold) is achieved. Beneficially, determining the boundaries between the time or frequency slots adaptively allows for boundary optimizations that can improve the pipe evaluations. Further, adaptive boundary determination in accordance herewith is useful in cases where the boundaries are not known a priori.

In some embodiments, the boundaries between time or frequency slots are determined sequentially, beginning with the slot for the innermost pipe (which corresponds to the earliest times or the highest frequencies). For a given slot, adaptively determining its boundary (the upper boundary in the time domain, and the lower boundary in the frequency domain) may involve iteratively increasing (for time boundaries) or decreasing (for frequency boundaries) the boundary until one or more estimated pipe parameter(s) computed from a portion of the input response signal ending at the boundary diverge between successive iterations. The estimated parameters are deemed to "diverge" if a difference metric that quantifies the deviation of the estimated parameter(s) computed with the current boundary from the estimated parameter(s) computed with the boundary of the immediately preceding iteration exceeds a specified threshold.

In some embodiments, applicable to pipes that have collars at certain depths along the pipes (herein "collar depths"), response signals are measured at various depths along the pipes (herein "measurement depths," to distinguish them from the positions at which the collars are placed), and then sampled at a set of values of the independent variable (i.e., time or frequency), which are herein referred to as "trial times" or "trial frequencies," respectively. (The "depth" along the pipe herein indicates the position along a longitudinal axis of the pipe; depth may (and does in instances where the pipes extend vertically into the ground), but need not, correspond to a dimension perpendicular to the earth's surface.) From the values of the response signals measured at different depths for a given trial time or frequency, a response magnitude can be computed as a function of depth. Further, by subtracting from each response-signal value the value of a reference response signal acquired at a certain fixed reference depth, a differential response magnitude can be computed. The depth-dependent differential response magnitude captures the effect of variations of pipe parameters relative to the pipe parameters at the reference depth. Thus, if the reference depth is a depth at which no collars are placed, the differential response magnitude generally exhibits peaks at the collar depths, due to the increased pipe thickness resulting from the collars. In collar-based boundary determination, the trial time or frequency (within a range of trial times or frequencies) at which the onset of peaks at certain depths can be observed in the differential response magnitude may be set as the boundary between the (time or frequency) slot associated with the pipe that has collars at these depths and the pipe immediately interior thereto.

The foregoing will be more readily understood from the following detailed description of various embodiments, in particular, when taken in conjunction with the accompanying drawings. In the example embodiments described herein, Eddy-current techniques are applied to nested casings within an oil or gas well. It is to be understood, however, that the disclosed signal-processing methodology is more broadly applicable to Eddy-current signals acquired for any kind of pipes, and can be implemented in suitable tools, systems, and/or computer-readable media without undue experimentation by a person of ordinary skill in the art given the benefit of the present disclosure.

FIG. 1 illustrates an example wellbore environment in which Eddy-current techniques and tools in accordance with various embodiments may be used. The well is shown during a wireline logging operation, which is carried out after drilling has been completed and the drill string has been pulled out of the wellbore 100. As depicted, the wellbore 100 has been completed with multiple nested casing strings, including, e.g., surface casing 102, intermediate casing 104, and production casing 104. While three casing strings 102, 104, 106 are shown in this example, the number of nested casing strings may generally vary, depending, e.g., on the depth of the wellbore 100.

Wireline logging generally involves measuring physical parameters of the wellbore 100 and surrounding formation—such as, e.g., the condition of the casing strings 102, 104, 106—as a function of depth within the wellbore. The measurements may be made by a probe or sonde 108 that is lowered into the wellbore 100 on a wireline 110 wound around the winch 112 of, e.g., a logging truck. The wireline 110 is generally an electrical cable that, in addition to delivering the sonde 108 downhole, may serve to transmit control signals and data telemetrically between the sonde 108 and a logging facility 116 (implemented, e.g., with a suitably programmed computer) located above surface, e.g., inside the logging truck. In some embodiments, the sonde 108 is lowered to the bottom of the region of interest and subsequently pulled upward, e.g., at substantially constant speed. During this upward trip, instruments included in the sonde 108 may perform measurements on the wellbore 100 and/or adjacent formation as they pass by, or as the sonde 108 remains stationary. The measurements may be communicated to the logging facility 116 for processing and/or storage thereat. In this manner, a log, that is, a sequence of measurements correlated with the depths along the wellbore 100 at which they are taken, is generated.

For Eddy-current measurements, the sonde 108 includes an electromagnetic transmitter, such as a current-carrying coil 118 and associated driver circuitry 120, that can be operated to induce Eddy currents in the surrounding casing strings 102, 104, 106 (which are usually made of steel and, thus, electrically conductive). The resulting changes in the current flowing through the coil 118 can be measured to capture the response of the casing to the induced Eddy currents; in this manner, the transmitter coil 118 may double as a receiver coil. Alternatively, electromagnetic response signals from the casing strings 102, 104, 106 may be captured with a separate receiver coil (not shown). Hereinafter, no distinction is made between electromagnetic response signals acquired by a transmitter/receiver or a separate receiver, as the processing methods described below are equally applicable to both. The sonde 108 may further include telemetry circuitry 122 for transmitting the response signals to the logging facility 116, and optionally processing circuitry 124 for at least partially processing the raw response signals downhole prior to the transmission to the surface. The transmitter(/receiver) coil 118 and associated driver circuitry 120 are hereinafter referred to as the "Eddy-current testing device," and the hardware and/or software used to process the Eddy-current response signals (whether integrated into the sonde 108, provided by the surface logging facility 116, implemented partially by both, or distributed in any other manner) is collectively referred to as the "processing facility."

Figure 2:
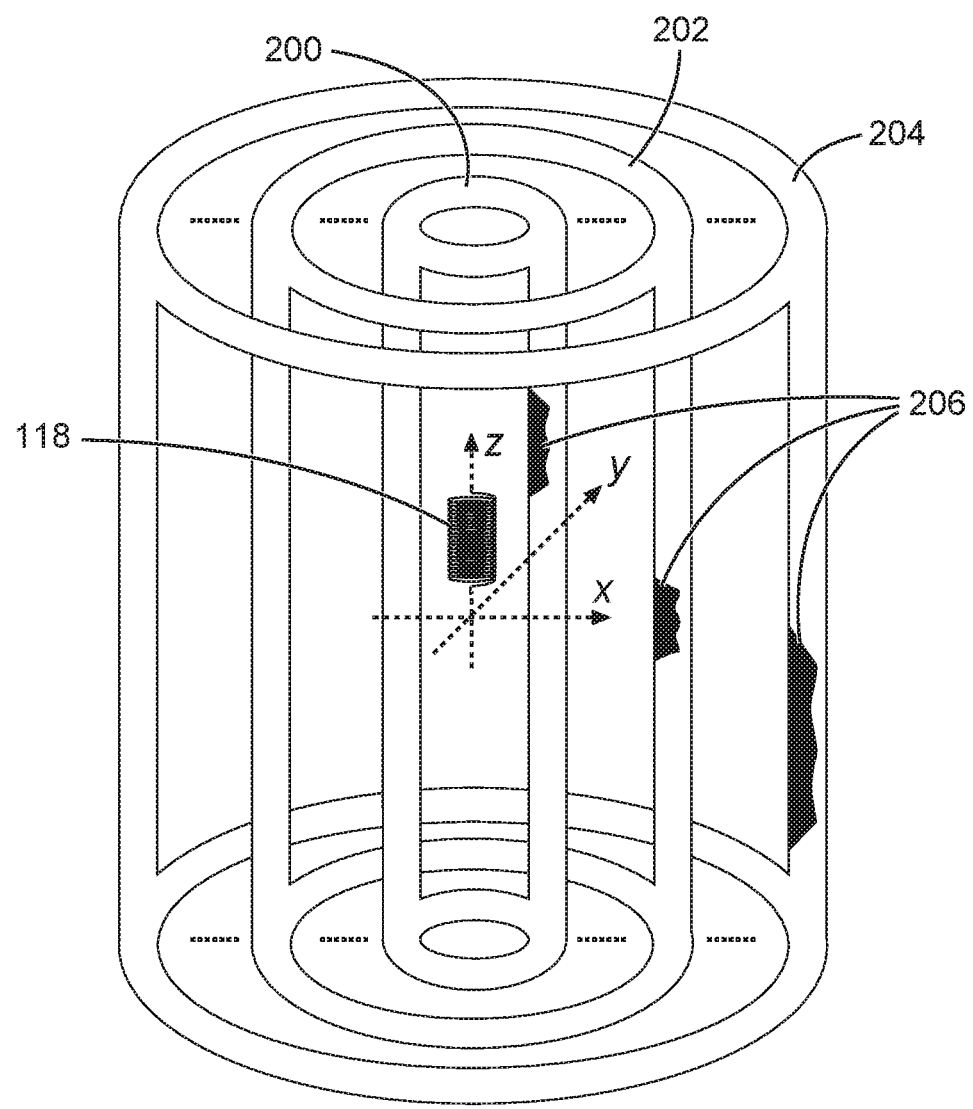
FIG. 2 is a perspective view of a set of concentric pipes and an Eddy-current device placed therein in accordance with various embodiments.

FIG. 2 provides a perspective view of a set of M nested pipes 200, 202, 204 (where M is generally any positive number equal to or greater than 2). For purposes of reference throughout the following discussion, the pipes are numbered consecutively, beginning with the innermost pipe 200 as the first pipe. As shown, the pipes 200, 202, 204 may be arranged substantially concentrically. (The qualifier "substantially" indicates, in this context, that pipes may be slightly off-centered in practice (e.g., by a distance amounting to less than 10% of the pipe diameter), due to inadvertent placement inaccuracies. In some embodiments, determining off-center distances is one of the objectives of Eddy-current-based pipe evaluations.) The thickness of each pipe may vary along the length of the pipe due to defects 206 resulting, e.g., from corrosion. These thickness variations, and/or depth-dependent variations of other pipe parameters (such as the pipe diameter, the off-set of the pipe center from the center of the substantially concentric arrangement (measured, e.g., as an absolute distance or relative to the pipe diameter), the off-set of the coil 118 from the center of the pipe arrangement, the electric conductivity a, or the magnetic permeability μ, etc.), can be measured using Eddy-current techniques as described herein. As further shown, the transmitter(/receiver) coil 118 of the Eddy-current testing device is usually oriented with its longitudinal axis parallel to the pipe axes; however, deviations from this orientation (including, e.g., coil orientation perpendicular to the pipe axes) are possible.

Figure 3A:
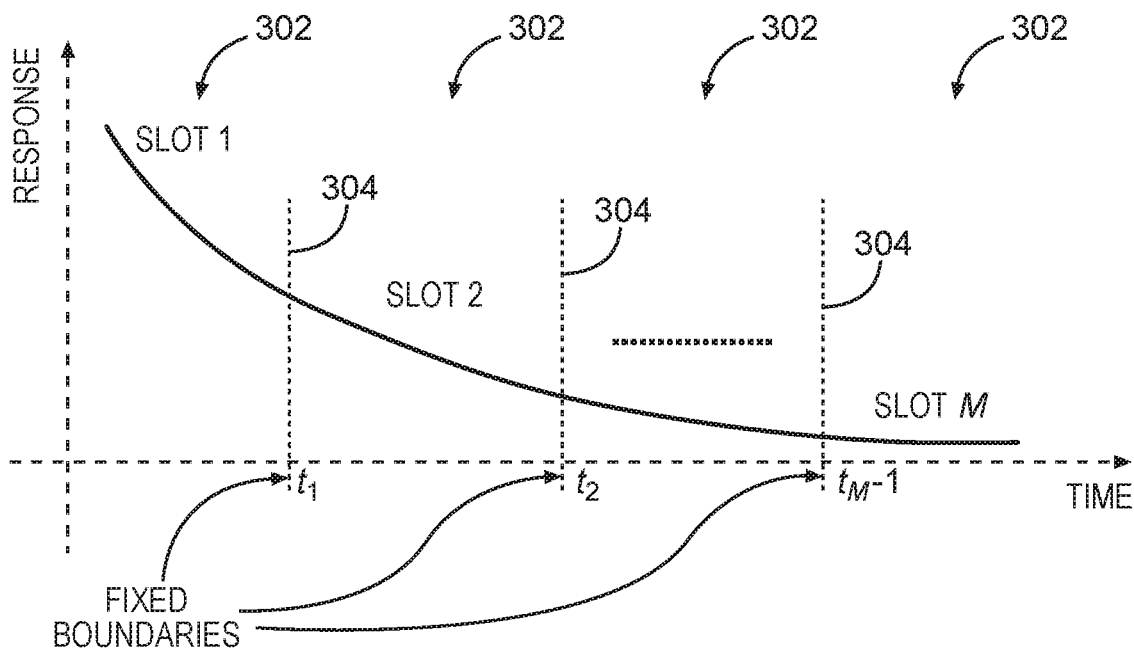
FIG. 3A is a graph of a time-dependent pulsed Eddy-current response signal, illustrating fixed allocation of the boundaries between multiple time slots corresponding to the various tubes shown in FIG. 2.
Figure 3B:
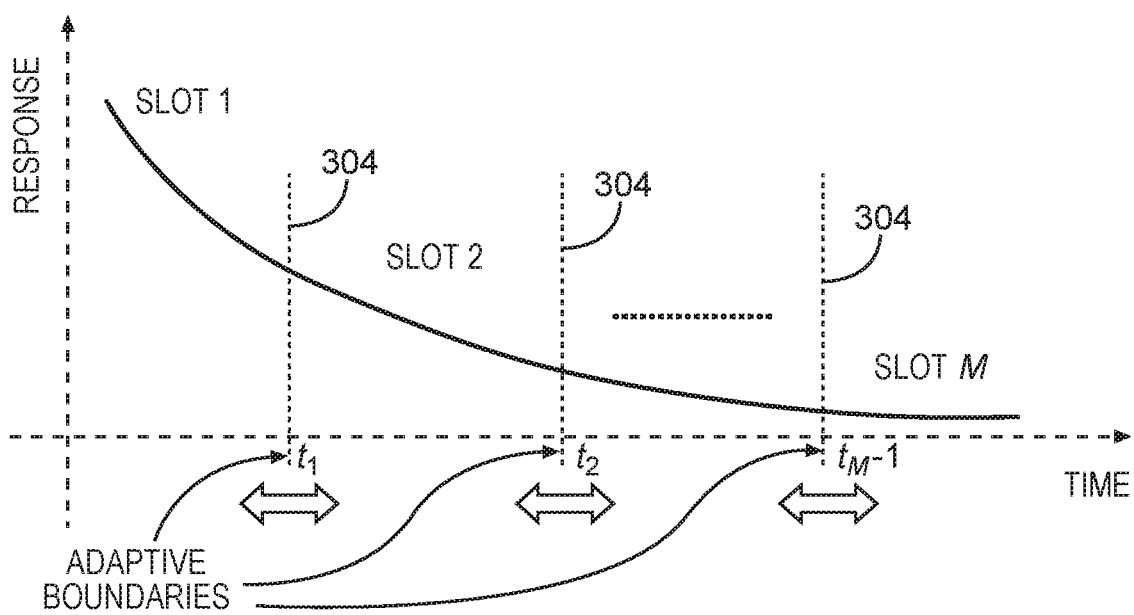
FIG. 3B is a graph of a time-dependent pulsed Eddy-current response signal, illustrating adaptive allocation, in accordance with various embodiments, of the boundaries between time slots corresponding to the various tubes shown in FIG. 2.

In PEC testing, a voltage pulse is applied to the coil 118. For example, the voltage may be increased from zero to some value (e.g., one Volt) and kept at that value for a specified amount of time (e.g., hundreds of milliseconds). When the voltage has reached a steady state, power to the coil 118 may be cut off such that the voltage quickly drops back to zero. During this transient state, Eddy currents are induced in the pipes 200, 202, 204. As a result of these Eddy currents flowing through the pipes 200, 202, 204, a current is induced in the coil 118 (or a separate receiver coil). This current (and/or the resulting voltage across the coil 118) constitutes the Eddy-current response signal, which decays to zero within about tens to hundreds of milliseconds. FIG. 3A shows an example Eddy-current response signal 300. To derive parameters of multiple nested pipes from the signal, the signal is divided into multiple time slots 302 (slots 1 through M) separated by time boundaries 304 ($t_1$ through $t_{M-1}$), and the i-th pipe within the set of nested pipes is evaluated based on the signal portion ending at time boundary $t_i$. In various prior-art methods, the time boundaries are fixed at the outset. In various approaches described herein, by contrast, an input response signal (e.g., a measured response signal) is processed to determine the time boundaries adaptively. FIG. 3B provides an example Eddy-current response signal in which the adaptive setting of the time boundaries is indicated by double-headed arrows.

Figure 4A:
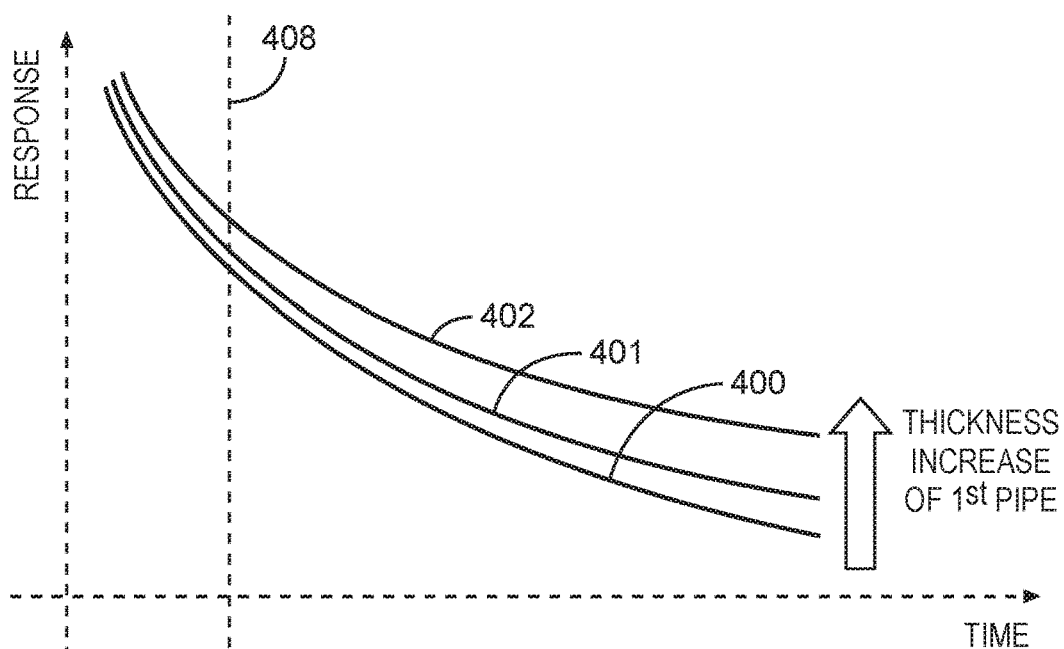
FIG. 4A is a graph of example time-dependent pulsed Eddy-current response signals for various thicknesses of the innermost pipe of a set of concentric pipes, illustrating a dependency of the response on the pipe thickness that may be exploited in accordance with various embodiments.
Figure 4B:
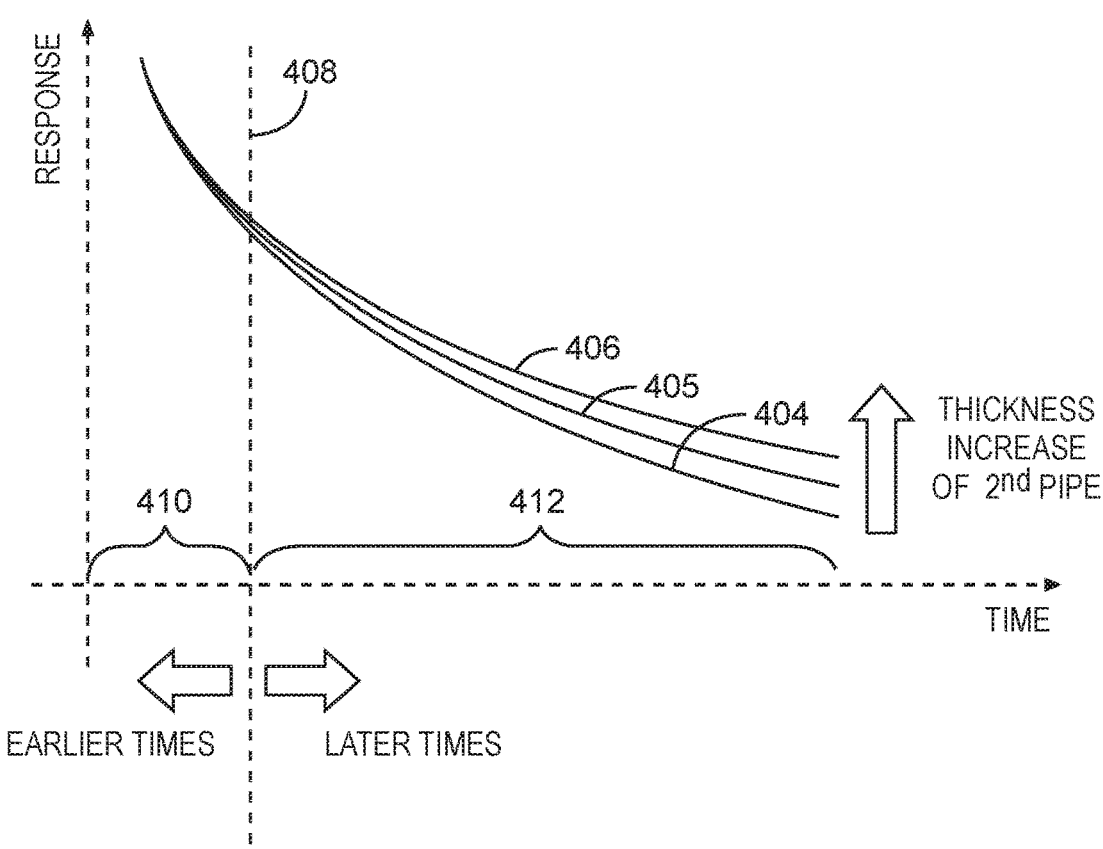
FIG. 4B is a graph of example time-dependent pulsed Eddy-current response signals for various thicknesses of the second pipe of a set of concentric pipes, illustrating a dependency of the response on the pipe thickness that may be exploited in accordance with various embodiments.

Eddy-current responses are generally processed in different time slots for different respective pipes because the different pipes affect different portions of the response signal differently, and a given portion of the response signal to varying degrees. This is illustrated in FIGS. 4A and 4B. FIG. 4A shows three response signals 400, 401, 402 resulting from three different thicknesses of the first (innermost) pipe within a set of nested pipes. As can be seen, the variation in thickness affects the entire response signal. By contrast, as shown in FIG. 4B, a variation in the thickness of the second pipe (with a first pipe of constant thickness) affects only later portions of the response signal. Accordingly, the three illustrated response signals 404, 405, 406, which correspond to increasing thicknesses of the second pipe, largely overlap up to a certain threshold 408, and then begin to diverge. Thus, the thickness of the first pipe may be determined based on the first portion 410 (to the left of the threshold 408) of the response signal (which is not influenced by the thickness of the second pipe, or of any other outer pipe, to a significant extent), and then the second portion 412 (to the right of the threshold 408) may be analyzed to determine the thickness of the second and outer pipes, taking the already determined thickness of the first pipe into account (e.g., by "subtracting out" its effect on the second portion 412). In other words, the threshold 408 may be taken to be the boundary between the first and second time slots. Comparisons of the response signals for varying thicknesses of the third pipe, fourth pipe, etc. would show a similar trend: pipes with increasingly larger diameters (and thus increasing distances from the centrally located coil 118) affect later and later portions of the time-dependent response signal, and suitable time boundaries for slots corresponding to respective pipes can therefore generally be set based on the onset of an effect of the pipe thickness on the response signal. The general behavior by which the response due to pipes further out appears later in the signal than the response due to pipes further in also holds for other geometric and material parameters of the pipes. Accordingly, the evaluation of nested pipes in general can be accomplished by analyzing the signal for consecutive time slots associated with respective pipes.

Of course, with reference to FIG. 4B, the identification of threshold 408, which conceptually corresponds to a time boundary, generally depends on a comparison of response signals acquired for multiple hypothetical thicknesses of the same (e.g., as shown, the first) pipe (as can be obtained, e.g., by computational modeling or by switching out pipes in an experimental set-up)—information that is not available from the response signal for a single set of nested pipes. In various embodiments, suitable time boundaries are nonetheless determined, based on an input response signal obtained for the specific set of nested pipes (by measurement or simulation), by computationally testing a range of values for a given time boundary between signal-portions corresponding to two adjacent pipes, and determining at which value the thickness (or other pipe parameter) of the outer of the two pipes starts affecting the signal.

Figure 5:
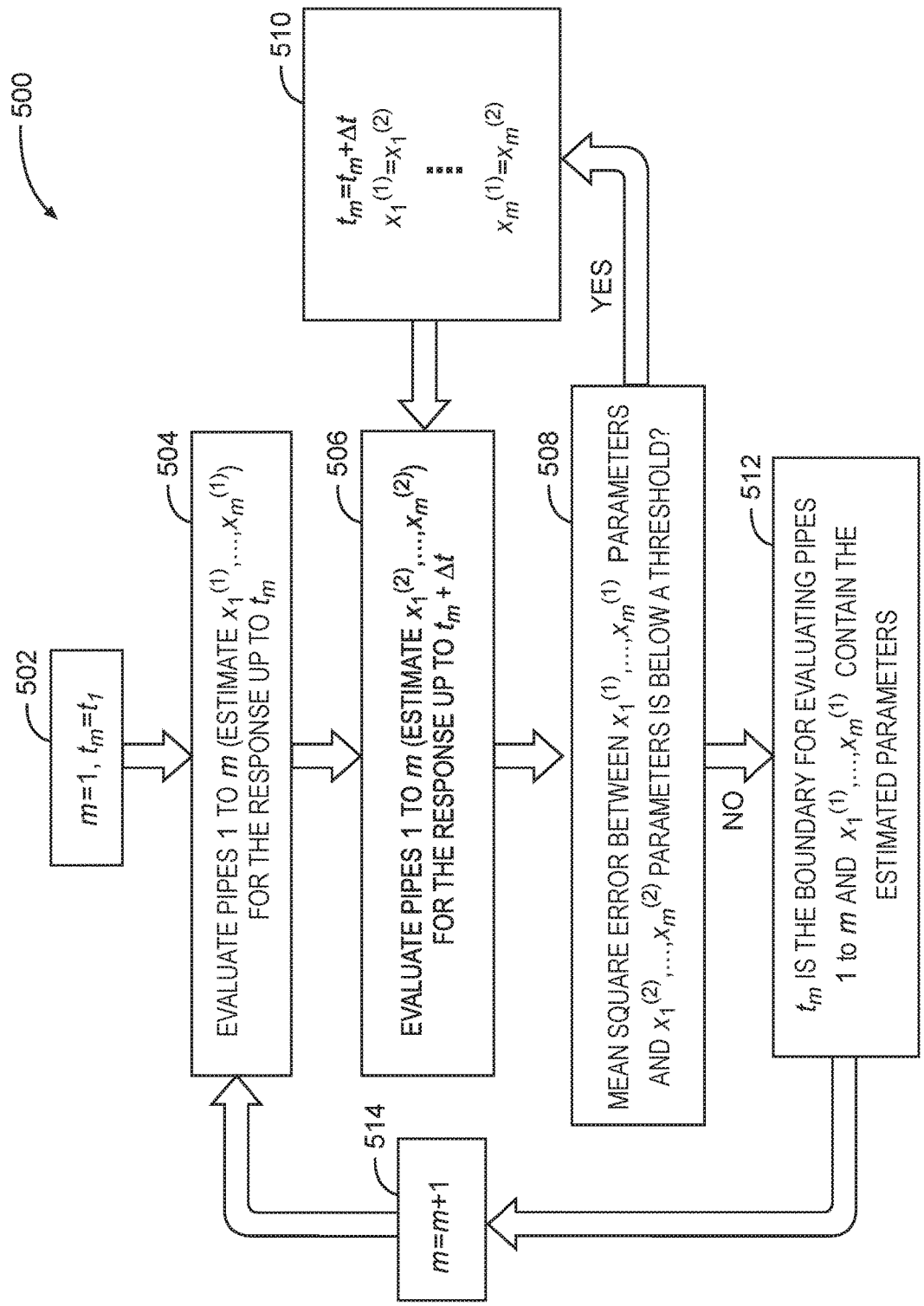
FIG. 5 is a flow chart of an iterative method for adaptively determining time boundaries within Eddy-current response signals in accordance with various embodiments.

FIG. 5 illustrates, in the form of a flow chart, an iterative method 500 for determining time boundaries based on an input response signal obtained for a set of nested pipes. The input response signal may be a signal directly measured for the nested pipes. Alternatively, it may be a signal computed by simulation (e.g., using a forward-model of electromagnetic field evolution and/or wave propagation) from a model of the pipe configuration. In an example embodiment, the method 500 begins with the evaluation of the first, innermost pipe (m=1) and the determination of the corresponding first time boundary ($t_m = t_1$) (indicated at 502). Using an initial guess for the first time boundary $t_1$, the first pipe is evaluated based on an analysis of the first portion of the input response signal, up to $t_1$, i.e., the first response-signal portion is processed (e.g., using an inversion method as described further below with reference to FIG. 12) to determine one or more estimated parameters of the first pipe (operation 504). The estimated parameters of the m-th pipe are herein denoted by a vector $\vec{x}_m$, which may contain multiple parameters such as e.g., electrical or other material properties and/or pipe dimensions. Following the initial determination, at 504, of the estimated parameters of the first pipe, herein denoted by $\vec{x}_{1(1)}$, $t_1$ is incremented by a small step $\Delta t$, and the estimated parameters of the first pipe are evaluated again based on the signal portion up to $t_1+\Delta t$ (operation 506); the newly computed estimated parameters are herein denoted by $\vec{x}_1^{(2)}$. Next, at operation 508, the deviation between the two sets of estimated parameters of the first pipe is evaluated by computing a suitable difference metric, such as, e.g., the mean square error:

$$MSE = |\vec{x}_1^{(1)} - \vec{x}_2^{(2)}|^2.$$

Other suitable difference metrics include, e.g., the root mean square error, the sum of absolute difference, etc. If the mean square error or other difference metric falls below a certain specified threshold, meaning that the incremental increase in the time boundary $t_1$ has not had a significant effect on the computed estimated parameters $\vec{x}_1$, $t_1$ is increased again (operation 510), and the estimated parameters are evaluated yet again for the updated time boundary (operation 506). On the other hand, if the difference metric exceeds the threshold, this is an indication that the second pipe has started influencing the response signal, and the estimated parameters of the first pipe as computed based on the response portion up to $t_1+\Delta t$, under the assumption that only one pipe is present, are no longer accurate. Accordingly, the time boundary $t_1$ is, at this point, set to its value immediately prior to the last increase (or a value substantially equal thereto), and the estimated parameters are taken to be $\vec{x}_1^{(1)}$ (operation 512). (The set value is deemed "substantially equal" to the value of the time boundary in the immediately preceding iteration if it approximates the value of the immediately preceding iteration at a specified level of precision, which can vary between embodiments. For instance, in accordance with various embodiments, the time boundary is set within a specified margin of error around the value of the boundary in the immediately preceding iteration; anywhere between the values of the immediately preceding iteration and the current iteration; of even anywhere within a certain (small) number of iterations around the immediately preceding iteration.) The process of incrementing the time boundary $t_1$ (at 510), re-computing the estimated parameters of the first pipe (506), and comparing the newly computed values of the estimated parameters with the previous values to compute the difference metric (508) are repeated iteratively until the specified threshold (which is properly chosen, e.g., empirically, to capture the onset of the effect of the second pipe on the response signal) is exceeded. In each iteration (beginning with the second iteration), $\vec{x}_1^{(1)}$ is set to $\vec{x}_1^{(2)}$ from the immediately preceding iteration.

Once the first time boundary and the parameters of the first pipe have been determined in the above-described manner, the method 500 proceeds, at 514, to the determination of the second time boundary, $t_2$. This determination, analogously to that of $t_1$, involves starting with an initial guess for the time boundary $t_2$, computing estimated pipe parameters $\vec{x}_2^{(1)}$ based on a response-signal portion ending at that time boundary (at 504), and iteratively incrementing the time boundary (at 510) (to $t_2+\Delta t$) and re-computing the estimated pipe parameters with the increased time boundary (at 504), yielding $\vec{x}_2^{(2)}$, until a difference metric computed from the estimated parameters of the current iteration and those of the immediately preceding iteration exceeds a specified threshold (e.g., the same threshold as used to determine $t_1$). When the determination of the second time boundary and the estimated parameters of the second pipe has been completed, the method 500 moves on to the third time boundary and the parameters of the third pipe (at 514), which are determined in the same processes (i.e., involving operations 504-512). In this manner, time boundaries $t_1$ through $t_{M-1}$, and the estimated parameters of all M pipes, are sequentially computed. (For the M-th pipe, the upper time boundary is simply the end of the acquired signal, assuming a signal of sufficient length to reach that far (i.e., beyond time boundary $t_{M-1}$).) While the example embodiment described above yields time boundaries and pipe parameters for each of the pipes within the nested set of pipes, it will be appreciated that the method can generally be used to determine time boundaries and parameters for any sub-set of the pipes, skipping one or more pipes if desired.

In some embodiments, as shown in FIG. 5, the estimated pipe parameters that are evaluated at each stage (and in each iteration of that stage) do not only include the parameters of the pipe associated with the time boundary that is being determined at this stage, but also the parameters of all pipes interior thereto. In other words, the previously estimated parameters of the inner pipes are estimated again. For example, during the process of iteratively determining the second time boundary, $t_2$, the parameters $\vec{x}_1$ of the first pipe, may be re-computed, along with the parameters $\vec{x}_2$ of the second pipe, at operation 504. However, the previously obtained estimated parameters provide a starting point, in subsequent stages, that can expedite the solution process and lead to more accurate results.

The method 500 depicted in FIG. 5 can be straightforwardly adapted, by those of ordinary skill in the art given the benefit of the present disclosure, to the processing of frequency-dependent response signals, as may be obtained, e.g., by Eddy-current testing with narrow-band excitation currents at a number of discrete frequencies and acquisition of the response as a function of frequency, or by Fourier-transform of measured time-dependent signals. (Herein, a signal converted to the frequency domain from a measured time-dependent signal is considered a "measured" signal as well.) In frequency-dependent response signals, pipes with increasing diameters affect signal portions at lower and lower frequencies, whereas the highest-frequency portions of the signal are influenced only by the innermost pipes. Accordingly, the sequential determination of boundaries between the frequency slots corresponding to the different pipes (where the slot for a given pipe begins, rather than ends, at the frequency boundary associated with that pipe), beginning with the innermost pipe, starts at the high-frequency end of the signal. Further, the initial guess of each frequency boundary is an upper estimate, and instead of being incremented or increased, the frequency boundary is iteratively decremented or decreased, until the estimated pipe parameters computed for successive values of the frequency boundary differ, in terms of a suitable difference metric, by more than a specified threshold. With these modifications, method 500 is analogously applicable to the determination of frequency boundaries and of estimated pipe parameters from frequency-dependent signals.

As noted above, Eddy-current testing in accordance herewith may serve, for example, to evaluate multiple concentric casing strings in an oil or gas well. Such casing strings are often assembled from multiple sections of casing, called "joints," of equal length (e.g., thirty-foot sections) that are connected by threaded collars. These collars vary in their dimensions and/or material properties, and thus their response to induced Eddy currents, from the other, generally uniform portions of the casing. While their positions along the wellbore may not be known in absolute terms, and may be different for different ones of the casing strings, the collars are often spaced uniformly at known intervals (e.g., every thirty feet, corresponding to the length of the sections). This information may be used to process Eddy-current response signals measured at various depths along the pipe, providing an alternative method for determining time or frequency boundaries within the response signals, as described in the following.

Figure 6:
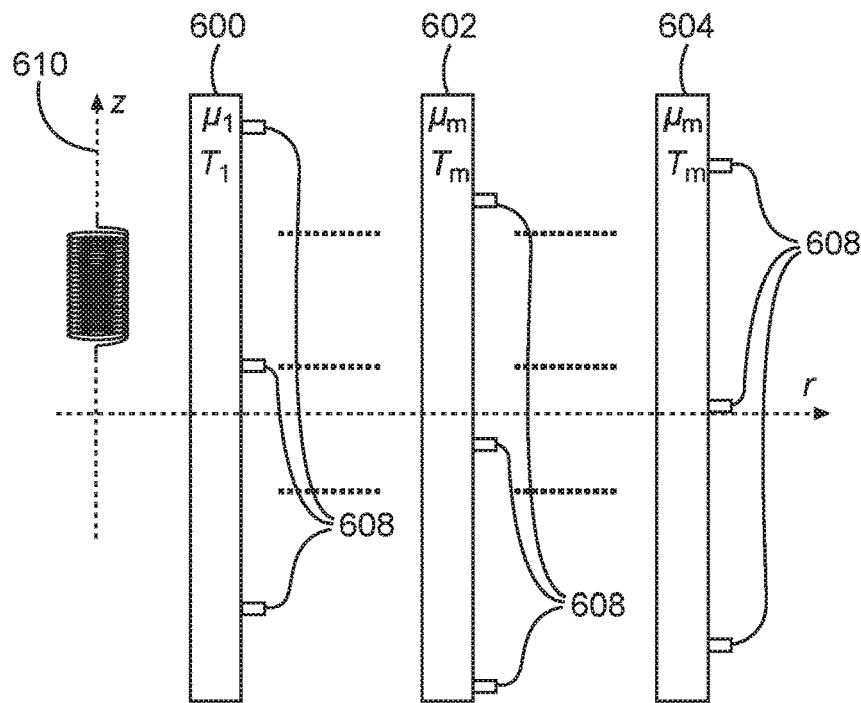
FIG. 6 is a conceptual illustration of a set of concentric pipes having collars at various depths in accordance with various embodiments.

FIG. 6 conceptually illustrates a set of concentric pipes 600, 602, 604 each having collars 608 at periodic depths (herein also referred to as collar depths) along the pipe. Since the pipes 600, 602, 604 are assumed to be cylindrically symmetric around a central axis 610 at which the Eddy-current-inducing coil 118 is placed, their position and thickness are depicted along the radial distance from the axis 610 (rather than along a Cartesian coordinate). The collars 608 are modelled as local increases in the thickness of the pipes 600, 602, 604. It is to be understood, however, that this merely indicates a change in the Eddy-current response signal due to a combination of differing dimensions and/or different material parameters, and need not correspond to an actual variation in the pipe thickness at the collar depths. As shown, the collar depths may, but need not necessarily, be different for different pipes.

Figure 7:
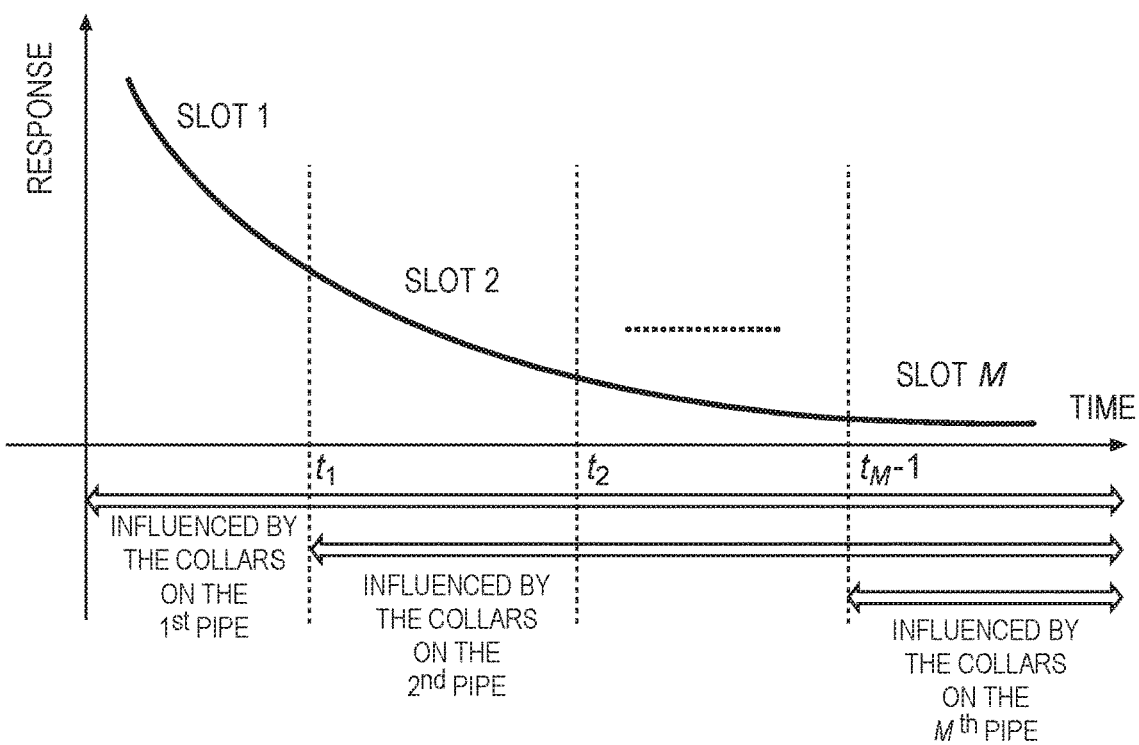
FIG. 7 is a graph of an example time-dependent pulsed Eddy-current response signal, illustrating which portions of the signal are affected by collars on the various pipes, as may be exploited in accordance with various embodiments.

FIG. 7 illustrates, along a time-dependent PEC response signal, which portions of the signal are influenced by collars on which pipes. As shown, collars on the first pipe generally influence the entire signal, whereas the effect of collars on subsequent pipes does not start until later and later times within the response signal. This is consistent with, and constitutes a special case of, the general behavior of response signals for nested pipes as illustrated in FIGS. 4A and 4B. It facilitates determining time boundaries between any two time slots by detecting the onset of signal variations due to collars of the pipe associated with the later of the two time slots.

Figure 8:
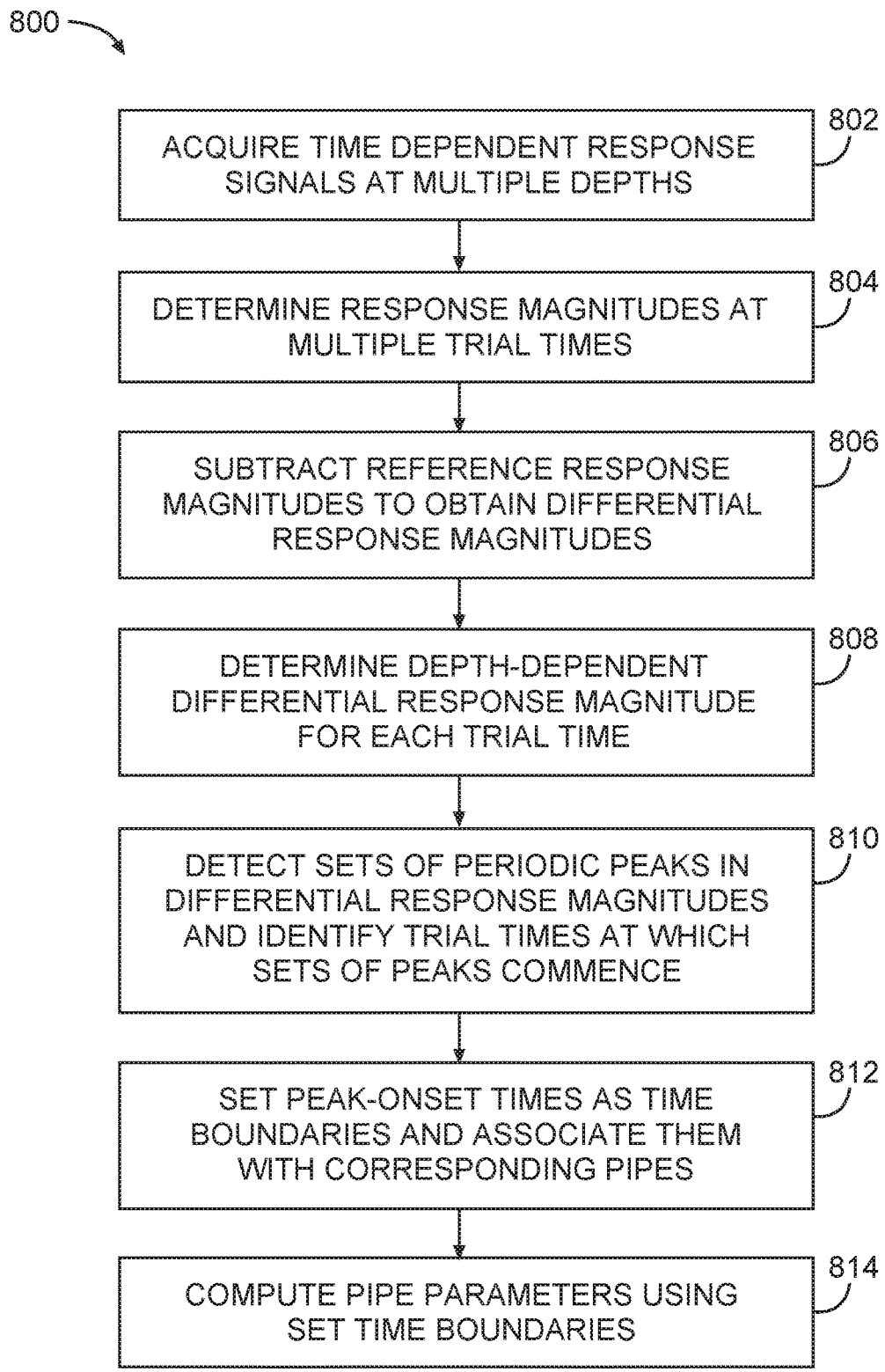
FIG. 8 is a flow chart of a collar-based method for adaptively determining time boundaries within Eddy-current response signals in accordance with various embodiments.

FIG. 8 illustrates, in the form of a flow chart, a collar-based method 800 for adaptively determining time boundaries within Eddy current response signals in accordance with various embodiments. The method begins with obtaining (by measurement or simulation) time-dependent response signals at various depths along the pipes (herein called measurement depths), which serve as the input response signals for the adaptive boundary determination (operation 802). The measurement depths are generally chosen to cover a depth region of interest at a sufficient resolution to capture signal variations resulting from the collars (e.g., at regular depth intervals comparable in size to the width of the collars). The input response signals are then sampled at certain discrete times (the same times across all signals), herein referred to as trial times, to determine the response magnitudes at those times (operation 804). The trial times are selected to cover a range in which at least one, and possibly all, of the time boundaries is or are expected, at intervals corresponding to the desired precision with which the time boundaries are to be determined.

Figure 9:
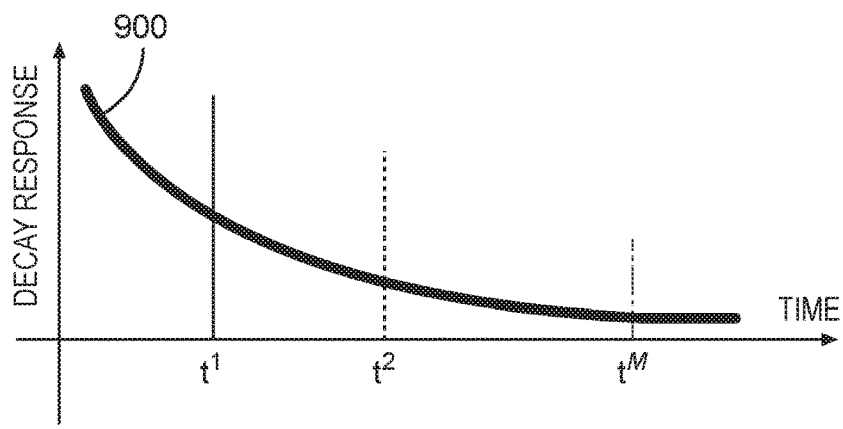
FIG. 9 is a graph of a time-dependent pulsed Eddy-current response signal, illustrating signal sampling at a set of trial times in accordance with the method of FIG. 8.
Figure 10A:
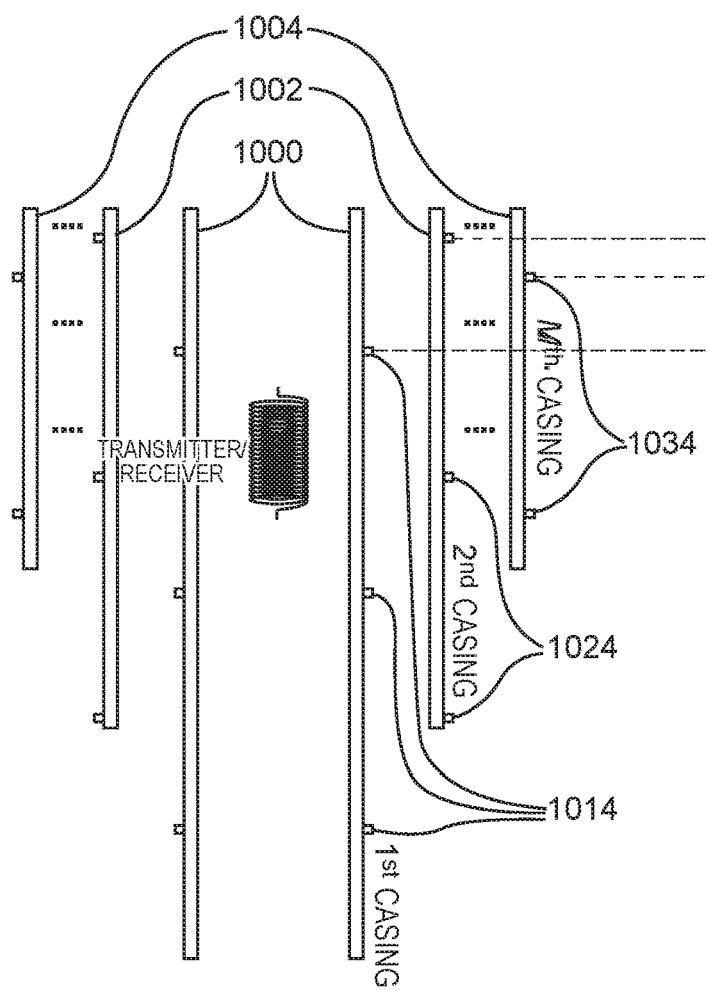
FIG. 10A is a cross-sectional view of a set of concentric pipes having collars at various depths in accordance with various embodiments.
Figure 10B:
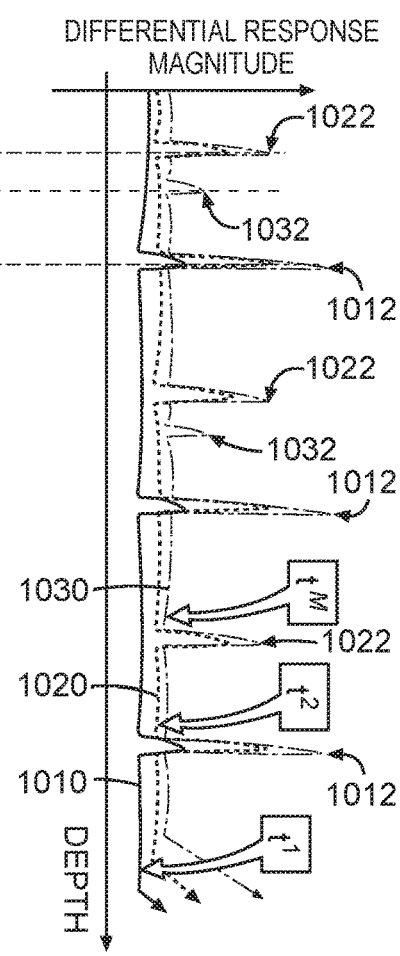
FIG. 10B is a graph of depth-dependent differential response magnitudes computed, in accordance with the method of FIG. 8, for the trial times illustrated in FIG. 9, illustrating peaks at the collar depths shown in FIG. 10A.

In some embodiments, a reference response signal is obtained for a depth at which no collar is present and sampled at the trial times, and the response magnitude of the reference signal is, for each of the trial times, subtracted from the corresponding response magnitude (i.e., the magnitude at the same respective trial time) of each of the other signals to obtain differential response magnitudes (operation 806). (Alternatively, the reference signal may be subtracted from each of the other input response signals prior to sampling the signals at the trial times. The resulting differential response magnitudes are the same in both cases.) For each trial time, the differential response magnitudes at the various depths are combined into a depth-dependent differential response magnitude (operation 808). The depth-dependent differential response magnitude generally has peaks at the collar depths of pipes that affect the response signals at the selected trial time, as is illustrated in FIGS. 9 and 10A and 10B. Note that the subtraction of reference response magnitudes (operation 806) is not always strictly necessary for the method 800 to work; without such reference subtraction, the depth-dependent response magnitude may still exhibit detectable variations (though not peaks, in general) at the collar depths. However, reference subtraction is beneficial in that it results in distinct peaks and thereby improves the detectability of the effect of the collars on the depth-dependent response magnitude.

FIG. 9 shows three trial times $t^1$, $t^2$, and $t^M$ within an example time-dependent response signal 900. In FIG. 10B, the differential response magnitude, as obtained by sampling the response signals measured at various depths and subtracting reference response magnitudes (operations 804, 806, 808), is plotted for each of these three trial times as a function of depth. As can be seen, the depth-dependent differential response magnitude for each trial time has one or more sets of periodically spaced variations (e.g., as shown, peaks) that line up with collars on the various casing pipes 1000, 1002, 1004, which are shown in FIG. 10A in a cross-sectional view of the nested-pipe arrangement. For example, the differential response magnitude 1010 for trial time $t^1$ (solid line) has peaks 1012 at depths at which collars 1014 are placed at the first casing 1000. These peaks 1012 also appear, with greater magnitude, in the differential response magnitude 1020 for trial time $t^2$ (dashed line). In addition, differential response magnitude 1020 for trial time $t^2$ also has peaks 1022 at depths at which collars 1024 are placed at the second casing 1002. The differential response magnitude 1030 for trial time $t^M$ (dash-dotted line) includes peaks 1012 and 1022 (with greater magnitudes than they have in the differential response magnitudes 1010, 1020 for earlier trial times), and further peaks 1032 at depths at which collars 1034 are placed at the M-th casing 1004. From the occurrence of these peaks, it can be inferred that $t^1$ falls in the first time slot, $t^2$ falls in the second time slot, and $t^M$ falls in the third time slot. As shown, peaks resulting from collars at a single pipe may vary in height between different trial times; in general, after collars on a certain pipe start influencing the response signals, the peaks in the depth-dependent differential response magnitude increase. For example, peaks due to collars on the first pipe, which are small in the depth-dependent differential response magnitude for $t^1$, may be larger in the depth-dependent differential response magnitude for $t^2$. Within the differential response magnitude for a given trial time, the sets of peaks resulting from collars on different pipes generally vary in magnitude, with the outermost one of the pipes usually having the smallest signal (for collars of similar thickness).

With renewed reference to FIG. 8, suitable time boundaries within the measured Eddy-current response signals can be determined from the depth-dependent differential response magnitudes by detecting sets of periodically spaced peaks therein, and identifying for each set of peaks, by comparison of the depth-dependent differential response magnitudes for various trial times, the trial time at which those peaks commence (operation 810). The identified onset time for a particular set of peaks may then be set (approximately) as the time boundary between a time slot associated with the pipe whose collars give rise to those peaks and the immediately preceding time slot, i.e., the time slot associated with the immediately interior pipe (operation 812). For example, the time boundary $t_1$ between the first and second time slots (not to be confused with the trial time $t^1$) may be chosen to be substantially the trial time at which peaks occur at the collar depths of the second pipe. In general, among the time boundaries determined based on the onset times of all the different sets of periodic peaks, the earliest time boundary is associated the first, innermost pipe, the second time boundary with the second pipe, etc., based on the observation that the outer pipes generally contribute to the response signals at later times. In this manner, previously unknown collar depths for the various pipes can be derived from measurements. If the collar depths for the various pipes are known a priori and are different for different pipes, the pipes can, alternatively, be associated to the time boundaries directly based on the depths within the depth-dependent differential response magnitude where the peaks occur. Once the time boundaries have been determined, individual measured Eddy-current response signals can be analyzed in accordance with the time boundaries to determine the parameters of the pipes at the respective measurement depths (operation 814).

It will be appreciated that the collars need not be periodically spaced along a pipe (although they often are). As long as peaks in the depth-dependent differential response magnitudes that result from collars can be identified as such (e.g., based on knowledge of the collar positions or spacing therebetween, or even based on a high level of confidence that the peaks are not caused by anything but collars), they can be used to determine time boundaries in accordance herewith. Like the iterative method 500, the collar-based method 800 for determining time boundaries can be modified, by those of ordinary skill in the art given the benefit of the instant disclosure, to determine frequency boundaries within frequency-dependent Eddy-current response signals. To do so, frequency-dependent response signals acquired at various depths are sampled at various trial frequencies, and for each trial frequency, the response magnitudes or, after subtraction of a reference signal, the differential response magnitudes at various depths are combined into a depth-dependent differential response magnitude, which will exhibit (e.g., periodic) variations at collar depths of the pipe that influences the response signals at the respective trial frequency. Comparing differential response magnitudes across trial frequencies, starting with the highest frequencies and moving towards lower and lower frequencies, the onset of (e.g., periodic) peaks signifies a frequency boundary between frequency slots corresponding to, respectively, a pipe with collars that give rise to the peaks and the pipe immediately interior thereto.

Figure 11:
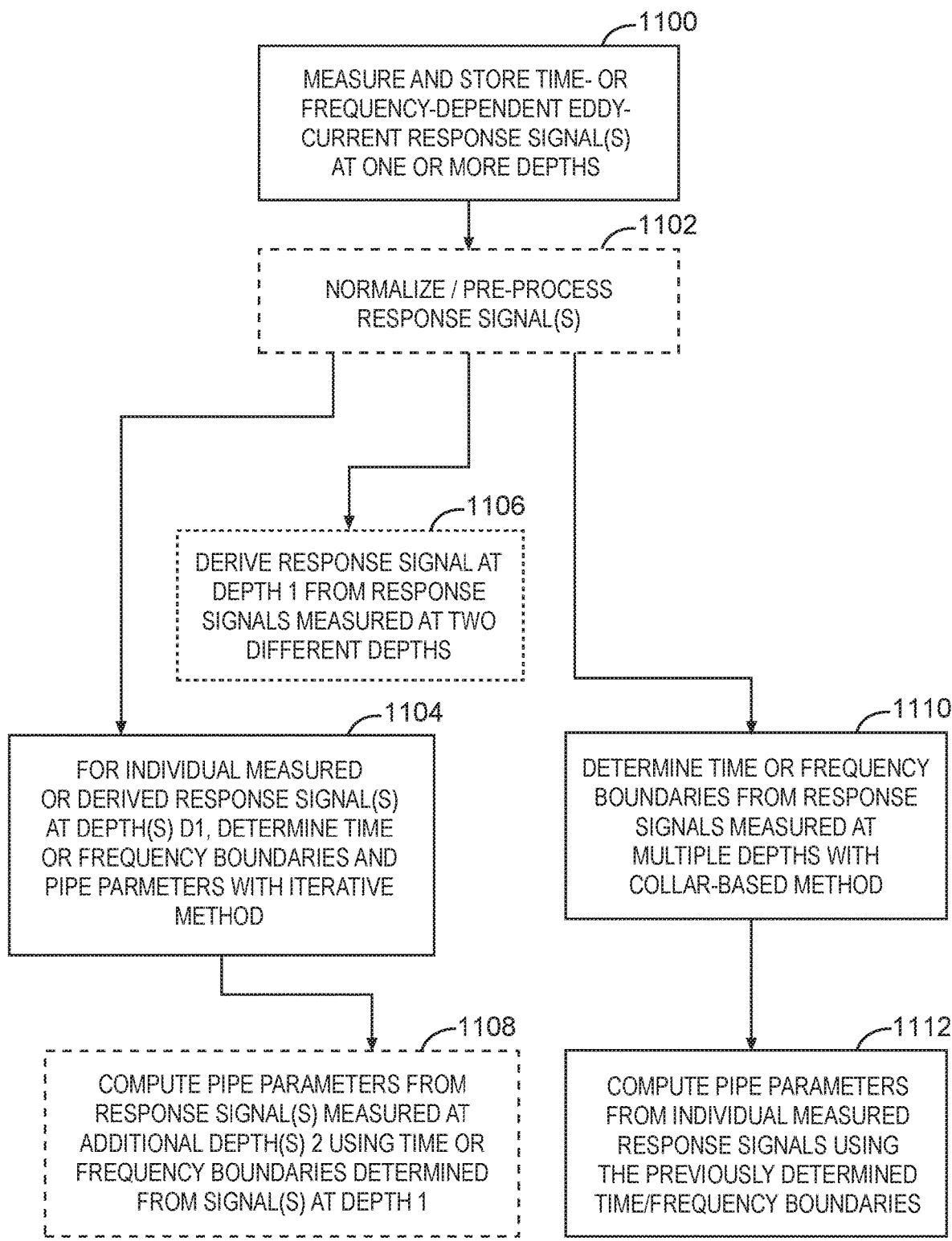
FIG. 11 is a flow chart summarizing methods, in accordance with various embodiments, for adaptively determining time or frequency boundaries within Eddy-current response signals.

FIG. 11 is a flow chart summarizing various methods for adaptively determining time or frequency boundaries within Eddy current response signals. The methods generally involve obtaining one or more time- or frequency-dependent Eddy-current response signals at one or more respective depths along the pipes (e.g., by direct measurement or, in the case of frequency-dependent signals, measurement in the time domain followed by Fourier transform), and storing the signal (after digitization) in memory (e.g., downhole memory or, following transmission of the acquired data uphole in memory of the surface logging facility 116) (operation 1100). In some embodiments, the signals are normalized or otherwise pre-processed (operation 1102). Normalization may be achieved, e.g., by substituting all signal samples with the ratio of two neighboring samples (or, more generally, the ratios of samples separated by a certain fixed number of intervening samples). The (if applicable, normalized or pre-processed) signals can then be processed in different ways to determine time or frequency boundaries and evaluate pipe parameters in accordance therewith.

One approach involves analyzing the measured response signals (or input response signals obtained for the nested pipes by simulation) individually for each depth to iteratively increment time boundaries or decrement frequency boundaries, and compute pipe parameters at each iteration, until the pipe parameter values of successive iterations diverge (operation 1104); this approach is described in detail above with respect to FIG. 5. In some embodiments, the determination of time or frequency boundaries as well as pipe parameters at a certain depth is based, not on a directly measured signal, but on a signal derived, e.g., by extrapolation or interpolation, from signals measured at two or more different depths (see operation 1106). In this manner, the depth resolution of boundary- and pipe-parameter determination can be increased beyond that of the measurements, and estimated pipe parameters can be obtained even at depths that are not directly accessible to Eddy-current testing. Further, once time or frequency boundaries have been determined at a certain depth D1 (at operation 1004), these boundaries may be used, in some embodiments, in the analysis of signals acquired at different depths D2 to compute pipe parameters from these signals (operation 1108).

A different approach, available when the pipes have collars (or, more generally, dimensional or material variations at known depths or known depth intervals) involves determining time or frequency boundaries by collectively processing response signals measured at multiple depths to detect variations in the depth-dependent (differential) response magnitudes (operation 1110), as explained with respect to FIGS. 8-10B. After the time or frequency boundaries have been determined, pipe parameters can be computed in accordance with these boundaries from the individual response signals acquired at the various depths (operation 1112). Collar-based and iterative time- or frequency-boundary determination methods may also be combined. For instance, in some embodiments, a collar-based method is used to determine initial boundaries, which are thereafter further refined using the iterative approach.

Figure 12:
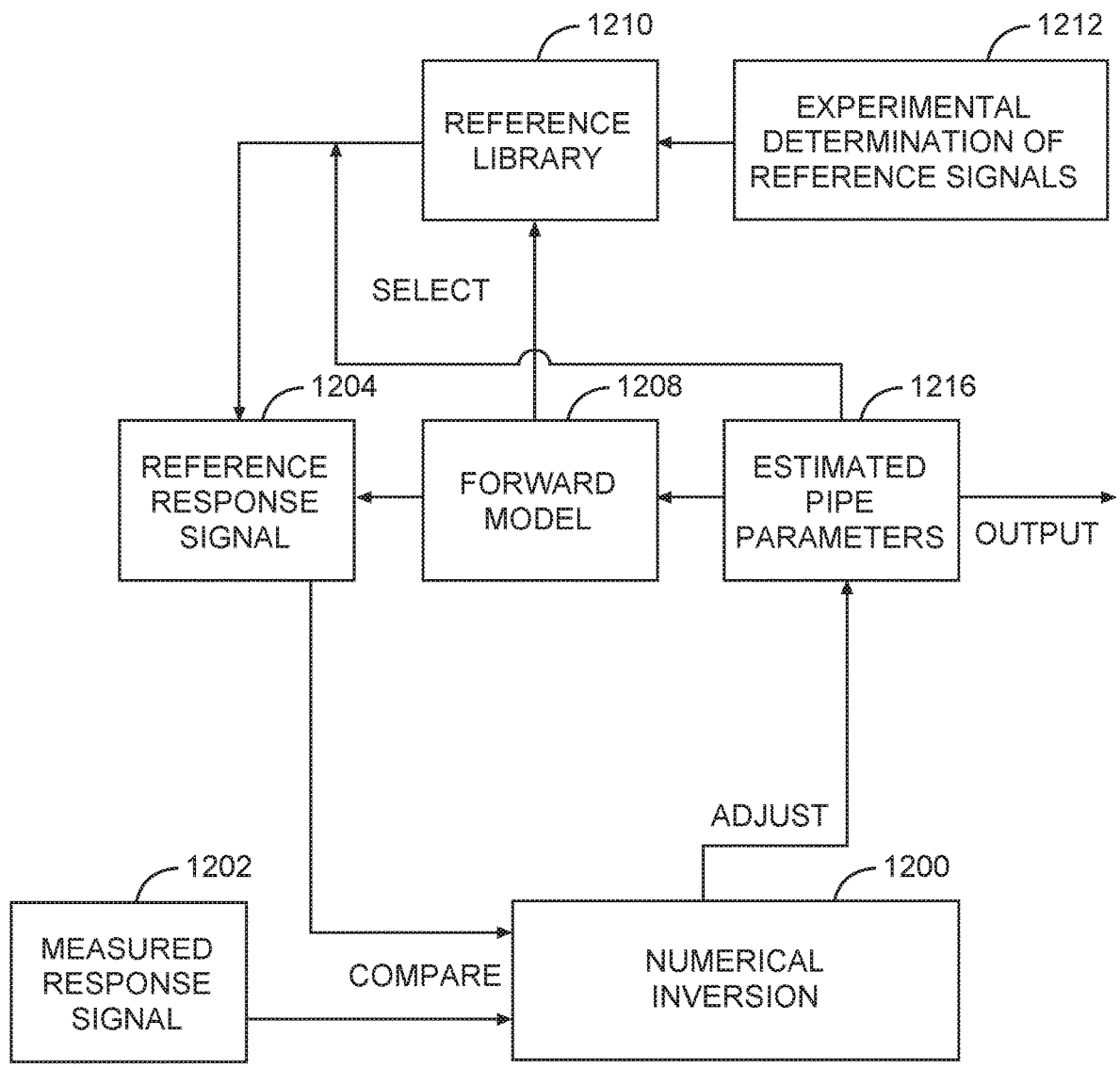
FIG. 12 is a block diagram illustrating an inversion method for computing estimated pipe parameters from Eddy-current response signals in accordance with various embodiments.

The methods illustrated in FIG. 11 include the computation of pipe parameters from measured (or derived) time- or frequency-dependent response signals, either as an integral part of the iterative boundary-determination process (as in operation 1104), or as a separate operation following the boundary determination (as in operations 1108 and 1112). This computation of pipe parameters may utilize a numerical inversion scheme as known in the art, e.g., as illustrated in FIG. 12. The inversion 1200 is based on the comparison of the acquired response signals 1202 (i.e., measured response signals or response signals derived from measured signals) with reference response signals 1204 that depend on the estimated pipe parameters 1206, and may involve, for instance, the iterative adjustment of the estimated pipe parameters 1206 until a reference response signal 1204 computed or selected based thereon is consistent with the acquired response signal 1202 (i.e., differs from the acquired response signal by less than a specified consistency threshold). In some embodiments, the reference response signal 1204 is computed, for each set of pipe-parameter values being tried in the iterative procedure, by computing, with a forward model 1208, the Eddy-current response to be expected in nested pipes having these parameter values.

Alternatively, reference response signals 1204 may be pre-computed for various sets of pipe-parameters and stored in a reference library 1210 (e.g., within a database), from which a reference response signal 1204 whose pipe parameters most closely match the currently tested parameter values 1204 may then be selected during then inversion procedure 1200. In other embodiments, the reference response signals 1204 are determined experimentally (see 1212) for various combinations of pipe parameters 1206, and stored in the reference library 1210, from which the appropriate reference response signal 1204 may be selected. Alternative techniques for determining estimated pipe parameters include, e.g., pattern-matching between acquired response signals 1202 and reference response signals 1204. In these techniques, certain features in the acquired responses are compared with the features in the reference signals to find the closest match. The parameters corresponding to the reference signal with the closest features to those of the acquired response are then taken to be the solution to the problem. In the inversion procedure, effects due to the presence of a housing containing the Eddy-current testing device, a pad structure, and/or mutual coupling between multiple Eddy-testing coils, or due to mud or cement in the pipes can be corrected by using a priori information. Since these effects are generally additive, they can be removed using proper calibration schemes. The multiplicative (i.e., scaling) portion of the effects can be removed in the process of calibration to an existing log. Removal of such effects is well-known in electromagnetic well logging.

Figure 13:
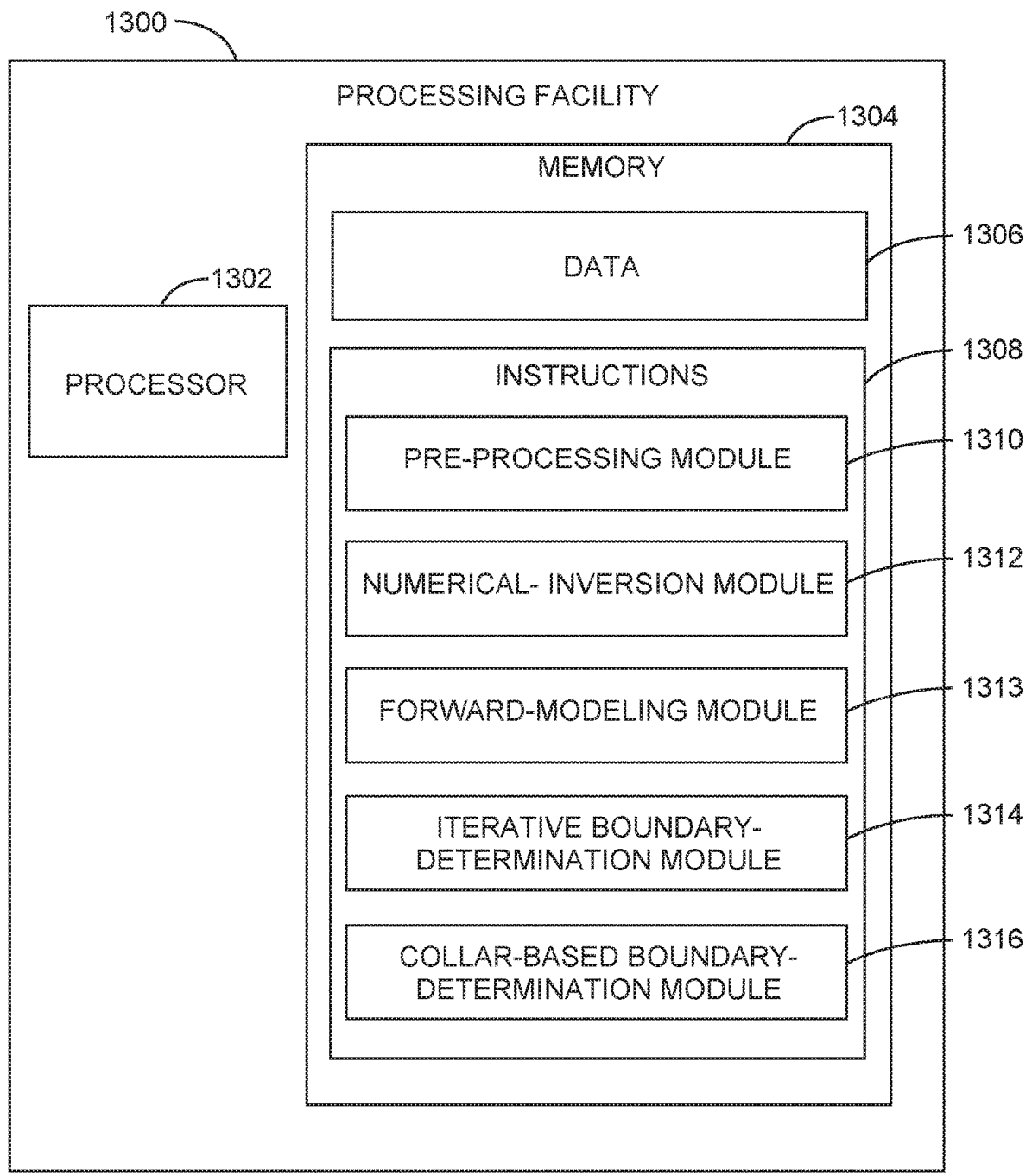
FIG. 13 is a block diagram of a processing facility, in accordance with various embodiments, for processing Eddy-current response signals using adaptive boundaries between time or frequency slots.

The FIG. 13 is a block diagram of a processing facility 1300, in accordance with various embodiments, for processing Eddy-current response signals using adaptive boundaries between time or frequency slots. As mentioned above with respect to FIG. 1 the processing facility 1300 may be implemented, e.g., by processing circuitry 124 contained within a wireline sonde 108, a logging facility 116 above surface, or a combination of both. Alternatively, the processing facility 1300 may be provided separately from the wireline logging (or other measurement) system, and the measured Eddy-current response signals may be transferred to the processing facility 1300 via, e.g., a communication network or using a non-transitory machine-readable storage medium (such as, e.g., a hard disk, CD, flash drive, etc.).

In general, the processing facility 1300 can be implemented using any suitable combination of hardware (e.g., hardwired circuitry, microprocessors, etc.) and/or software. In various embodiments, the processing facility 1300 includes one or more (e.g., general-purpose) processors 1302 and associated memory 1304 for storing data 1306 (such as the measured response signals and functions and parameters computed therefrom, and optionally a reference signal library or other data needed for signal processing) as well as instructions 1308, executable by the processor(s) 1302, for carrying out the methods described herein. By virtue of execution of the instructions 1308 by a general-purpose processor 1302, the processor 1302 and associated 1304 may be temporarily or transitorily configured to perform the special operations of the methods described herein. The instructions may also be stored, in accordance with some embodiments, on a non-transitory machine-readable medium. The term "machine-readable medium," as used herein, generally denotes any tangible medium, or multiple media, capable of storing, encoding, or carrying instructions for execution by a machine and/or data structures utilized by or associated with such instructions. Machine-readable media include, for instance, solid-state memories as well as optical and magnetic media. Specific examples include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

As shown in FIG. 13, the instructions 1308 may be grouped into various functional modules, including, e.g., a pre-processing module 1310, a numerical-inversion module 1312 for computing pipe parameters from response signals based on set time or frequency boundaries (e.g., as illustrated in FIG. 12) and a forward-modeling module 1313 for computing reference response signals as used in the inversion, an iterative boundary-determination module 1314 (which may call the numerical-inversion module 1312 as necessary) for implementing the method of FIG. 5, and a collar-based boundary-determination module 1316 for implementing the method of FIG. 8. In some embodiments, the processing facility 1300 is provided in the form of a general-purpose computer including, in addition to a processor 1302 and memory 1304, user-interface devices (e.g., keyboard, mouse, and display screen), permanent storage media and devices (e.g., a hard-disk and disk drive), a network connection, and a bus facilitating communication between these components.

The following numbered examples are illustrative embodiments.

1. A method comprising: inducing pulsed Eddy currents in a plurality of nested pipes at one or more depths along the pipes, and measuring one or more respective time- or frequency-dependent electromagnetic response signals; determining one or more time or frequency boundaries associated with respective one or more of the nested pipes based, at least in part, on at least one input time-dependent or frequency-dependent electromagnetic response signal; and processing at least one of the measured time-dependent or frequency-dependent response signals, or a response signal derived therefrom, in accordance with the one or more time or frequency boundaries, respectively.

2. The method of example 1, wherein the at least one input response signal comprises one of the one or more measured response signals.

3. The method of example 1, wherein the at least one input response signal is obtained by simulation from a model of the nested pipes.

4. The method of example 1 or example 2, wherein, for each of the pipes, a time or frequency boundary associated therewith is determined.

5. The method of example 4, wherein the processing comprises determining at least one estimated parameter for each of the pipes from a portion of the measured or derived response signal ending at the time boundary or beginning at the frequency boundary associated with the respective pipe.

6. The method of any preceding example, wherein the response signals are time-dependent, and wherein determining the one or more time boundaries comprises: for at least one of the pipes, determining at least one estimated parameter for the pipe based on a portion of the at least one input signal ending at an initial value of the time boundary; iteratively (i) increasing the time boundary to an increased value, (ii) determining the at least one estimated parameter for the pipe based on a portion of the at least one input response signal ending at the increased value of the time boundary, and (iii) computing a difference metric between the at least one estimated parameter as computed for the increased time boundary and the at least one estimated parameter as computed for an immediately preceding iteration until the difference metric exceeds a specified threshold; and, once the difference metric exceeds the specified threshold, setting the time boundary to a value that is substantially equal to the value of the time boundary in the immediately preceding iteration.

7. The method of any of examples 1-5, wherein the response signals are frequency-dependent, and wherein determining the one or more frequency boundaries comprises: for at least one of the pipes, determining at least one estimated parameter for the pipe based on a portion of the at least one input response signal beginning at an initial value of the frequency boundary; iteratively (i) decreasing the frequency boundary to a decreased value, (ii) determining the at least one estimated parameter for the pipe based on a portion of the at least one input response signal beginning at the decreased value of the frequency boundary, and (iii) computing a difference metric between the at least one estimated parameter as computed for the decreased frequency boundary and the at least one estimated parameter as computed for an immediately preceding iteration until the difference metric exceeds a specified threshold; and, once the difference metric exceeds the specified threshold, setting the frequency boundary to a value that is substantially equal to the value of the frequency boundary in the immediately preceding iteration.

8. The method of any preceding example, wherein the time or frequency boundaries for the one or more of the nested pipes are computed sequentially beginning with an innermost pipe, the method further comprising computing, along with the at least one estimated parameter of an outer pipe with which a particular time boundary is associated, at least one estimated parameter of at least one pipe nested inside the outer pipe.

9. The method of any of examples 1-5, wherein at least one of the nested pipes has one or more collars located at one or more collar depths along the pipe; wherein time-dependent or frequency-dependent electromagnetic response signals are obtained for a plurality of measurement depths along the pipes; and wherein determining the time boundaries or frequency boundaries for the one or more of the nested pipes comprises: computing, for a plurality of trial times or trial frequencies, a differential response magnitude as a function of measurement depth, and setting the time boundary or frequency boundary for at least one of the nested pipes to a trial time or trial frequency, among the plurality of trial times or trial frequencies, at which variations in the differential response magnitude substantially at the one or more collar depths of an immediately surrounding pipe commence.

10. The method of example 9, wherein at least one of the one or more collar depths or spacings between the one or more collar depths are known.

11. The method of example 9 or example 10, wherein the collar depths differ between different ones of the pipes.

12. The method of any preceding example, wherein the at least one input response signal comprises a response signal measured at a first depth along the nested pipes, the method further comprising determining at least one estimated parameter for at least one of the nested pipes from a portion, ending at the time boundary or beginning at the frequency boundary associated with the respective pipe, of a response signal measured at a second depth along the nested pipes that is different from the first depth.

13. The method of any preceding example, wherein Eddy currents are induced and electromagnetic response signals are measured at two or more depths along the nested pipes, and wherein the at least one input response signal is derived from the two or more measured electromagnetic response signals.

14. The method of any of examples 1 and 4-13, wherein the at least one input response signal is derived from the at least one measured electromagnetic response signal by computing ratios between pairs of signal values at fixed time or frequency intervals.

15. A system comprising: an Eddy-current testing device for use inside a plurality of nested pipes, the device to induce Eddy currents in the plurality of nested pipes at one or more depths along the pipes and to measure one or more respective time-dependent or frequency-dependent electromagnetic response signals; and a processing facility to determine for one or more of the pipes a time boundary or a frequency boundary associated therewith based at least in part on at least one input electromagnetic response signals, and to process at least one of the one or more measured response signals, or a signal derived therefrom, in accordance with the time boundaries or frequency boundaries, respectively.

16. The system of example 15, wherein the at least one input response signal comprises one of the one or more measured response signals.

17. The system of example 16, wherein the electromagnetic response signals are time-dependent, and wherein the processing facility is to determine the one or more time boundaries by: determining at least one estimated parameter for at least one of the pipes based on a portion of the at least one input response signal ending at an initial value of the time boundary; iteratively (i) increasing the time boundary to an increased value, (ii) determining the at least one estimated parameter for the at least one pipe based on a portion of the at least one input response signal ending at the increased value of the time boundary, and (iii) computing a difference metric between the at least one estimated parameter as computed for the increased time boundary and the at least one estimated parameter as computed for the immediately preceding iteration until the difference metric exceeds a specified threshold; and, once the difference metric exceeds a specified threshold, setting the time boundary to a value that is substantially equal to the value of the time boundary in the immediately preceding iteration.

18. The system of example 16, wherein the electromagnetic response signals are frequency-dependent, and wherein the processing facility is to determine the one or more frequency boundaries by: determining at least one estimated parameter for at least one of the pipes based on a portion of the at least one input response signal beginning at an initial value of the frequency boundary; iteratively (i) decreasing the frequency boundary to a decreased value, (ii) determining the at least one estimated parameter for the at least one pipe based on a portion of the at least one input response signal beginning at the decreased value of the frequency boundary, and (iii) computing a difference metric between the at least one estimated parameter as computed for the decreased frequency boundary and the at least one estimated parameter as computed for the immediately preceding iteration until the difference metric exceeds a specified threshold; and, once the difference metric exceeds a specified threshold, setting the frequency boundary to a value that is substantially equal to the value of the frequency boundary in the immediately preceding iteration.

19. The system of example 16, wherein at least one of the nested pipes has one or more collars located at one or more collar depths along the pipe; wherein response signals are obtained for a plurality of measurement depths along the pipe; and wherein the processing facility is to determine the time boundaries or frequency boundaries from the obtained response signals by: computing, for a plurality of trial times or trial frequencies, a differential response signal as a function of depth; and setting the time boundary or frequency boundary for at least one of the pipes to a trial time or trial frequency, among the plurality of trial times or trial frequencies, at which variations in the differential response magnitude substantially at the one or more collar depths of an immediately surrounding pipe commence.

20. The system of example 19, wherein the processing facility is further to compute at least one estimated parameter for at least one of the pipes from a portion of the measured or derived response signal that ends at the time boundary or begins at the frequency boundary associated with the respective pipe.

21. A machine-readable medium storing machine-executable instructions for processing one or more time-dependent or frequency-dependent electromagnetic response signals measured in response to induction of Eddy currents in a plurality of nested pipes, where the instructions, when executed by a machine, cause the machine to determine, for each of the pipes, a time boundary or frequency boundary associated therewith based at least in part on at least one input electromagnetic response signal obtained for the plurality of nested pipes; and process at least one of the one or more measured time-dependent or frequency-dependent response signals in accordance with the time boundaries or frequency boundaries, respectively.

Many variations may be made in the system, devices, and techniques described and illustrated herein without departing from the scope of the inventive subject matter. Accordingly, the described embodiments are not intended to limit the scope of the inventive subject matter. Rather, the scope of the inventive subject matter is to be determined by the scope of the following claims and all additional claims supported by the present disclosure, and all equivalents of such claims.

What is claimed is:

1. A method comprising:
   measuring one or more responses signals generated by inducing pulsed Eddy currents in a plurality of nested pipes at one or more depths along the pipes;
   determining one or more boundaries between a plurality of time slots or a plurality of frequency slots, wherein each of the time slots or frequency slots is associated with a respective one or more of the pipes based, at least in part, on at least one input response signal, wherein said determining the one or more boundaries comprises, for each of at least one of the pipes, iteratively comparing estimated parameters for the pipe based on a portion of the input response signal coinciding with a boundary value with estimated parameters for the pipe based on a portion of the input response signal coinciding with an incremented boundary value; and
   processing at least one of the measured response signal, or a signal derived therefrom, in accordance with the one or more boundaries.

2. The method of claim 1, wherein the at least one input response signal comprises one of the one or more measured response signals.

3. The method of claim 1, wherein the at least one input response signal is obtained by simulation from a model of the nested pipes.

4. The method of claim 1, wherein the processing comprises determining at least one estimated parameter for each of the pipes from a portion of the measured response signal or derive signal ending at a time boundary or beginning at a frequency boundary associated with the respective pipe.

5. The method of claim 1, wherein said determining the one or more boundaries comprises determining one or more time boundaries including:
   for at least one of the pipes,
      determining at least one estimated parameter for the pipe based on a portion of the at least one input response signal ending at an initial value of a time boundary;
   iteratively
      (i) increasing the time boundary to an increased value,
      (ii) determining the at least one estimated parameter for the pipe based on a portion of the at least one input response signal ending at the increased value of the time boundary, and
      (iii) computing a difference metric between the at least one estimated parameter as computed for the increased time boundary and the at least one estimated parameter as computed for an immediately preceding iteration until the difference metric exceeds a specified threshold; and
   once the difference metric exceeds the specified threshold, setting the time boundary to a value that is substantially equal to the value of the time boundary in the immediately preceding iteration.

6. The method of claim 1, wherein said determining the one or more boundaries comprises determining one or more frequency boundaries including:
   for at least one of the pipes,
      determining at least one estimated parameter for the pipe based on a portion of the at least one input response signal beginning at an initial value of a frequency boundary;
   iteratively
      (i) decreasing the frequency boundary to a decreased value,
      (ii) determining the at least one estimated parameter for the pipe based on a portion of the at least one input response signal beginning at the decreased value of the frequency boundary, and
      (iii) computing a difference metric between the at least one estimated parameter as computed for the decreased frequency boundary and the at least one estimated parameter as computed for an immediately preceding iteration until the difference metric exceeds a specified threshold; and
   once the difference metric exceeds the specified threshold, setting the frequency boundary to a value that is substantially equal to the value of the frequency boundary in the immediately preceding iteration.

7. The method of claim 1, wherein the boundaries are computed sequentially beginning with an innermost pipe, the method further comprising computing, along with at least one estimated parameter of an outer pipe with which a particular time boundary is associated, at least one estimated parameter of at least one pipe nested inside the outer pipe.

8. The method of claim 1,
   wherein at least one of the nested pipes has one or more collars located at one or more collar depths along the pipe;
   wherein measured response signals are obtained for a plurality of measurement depths along the pipes; and
   wherein determining the boundaries comprises:

computing, for a plurality of trial times or trial frequencies, a differential response magnitude as a function of measurement depth; and setting a time boundary or a frequency boundary for at least one of the nested pipes to a trial time or trial frequency, among the plurality of trial times or trial frequencies, at which variations in a differential response magnitude substantially at the one or more collar depths of an immediately surrounding pipe commence.

9. The method of claim 8, wherein at least one of the one or more collar depths or spacings between the one or more collar depths are known.

10. The method of claim 8, wherein the collar depths differ between different ones of the pipes.

11. The method of claim 1, wherein the at least one input response signal comprises a response signal measured at a first depth along the nested pipes, the method further comprising determining at least one estimated parameter for at least one of the nested pipes from a portion, ending at a time boundary or beginning at a frequency boundary associated with the respective pipe, of a response signal measured at a second depth along the nested pipes that is different from the first depth.

12. The method of claim 1, wherein Eddy currents are induced and response signals are measured at two or more depths along the nested pipes, and wherein the at least one input response signal is derived from the two or more measured electromagnetic response signals.

13. The method of claim 1, wherein the at least one input response signal is derived from the one or more measured response signals by computing ratios between pairs of signal values at fixed time or frequency intervals.

14. A system comprising:
an Eddy-current testing device for use inside a plurality of nested pipes, the device to induce Eddy currents in the plurality of nested pipes at one or more depths along the pipes and to measure one or more response signals; and
a processing facility configured to:
determine one or more boundaries between a plurality of time slots or a plurality of frequency slots, wherein each of the time slots or frequency slots is associated with a respective one or more of the pipes based, at least in part, on a time-dependent or frequency-dependent input response signal, wherein said determining the one or more boundaries comprises, for each of at least one of the pipes, iteratively comparing estimated parameters for the pipe based on a portion of the input response signal coinciding with a boundary value with estimated parameters for the pipe based on a portion of the input response signal coinciding with an incremented boundary value; and
process at least one of the one or more measured response signals, or a signal derived therefrom, in accordance with the one or more boundaries.

15. The system of claim 14, wherein the at least one input response signal comprises one of the one or more measured response signals.

16. The system of claim 15, wherein the processing facility is configured to determine the one or more boundaries by determining one or more time boundaries including:
determining at least one estimated parameter for at least one of the pipes based on a portion of the at least one input response signal ending at an initial value of a time boundary;
iteratively
(i) increasing the time boundary to an increased value,
(ii) determining the at least one estimated parameter for the at least one pipe based on a portion of the at least one input response signal ending at the increased value of the time boundary, and
(iii) computing a difference metric between the at least one estimated parameter as computed for the increased time boundary and the at least one estimated parameter as computed for the immediately preceding iteration
until the difference metric exceeds a specified threshold; and
once the difference metric exceeds a specified threshold, setting the time boundary to a value that is substantially equal to the value of the time boundary in the immediately preceding iteration.

17. The system of claim 15, wherein the processing facility is configured to determine the one or more boundaries by determining one or more frequency boundaries including:
determining at least one estimated parameter for at least one of the pipes based on a portion of the at least one input response signal beginning at an initial value of a frequency boundary;
iteratively
(i) decreasing the frequency boundary to a decreased value,
(ii) determining the at least one estimated parameter for the at least one pipe based on a portion of the at least one input response signal beginning at the decreased value of the frequency boundary, and
(iii) computing a difference metric between the at least one estimated parameter as computed for the decreased frequency boundary and the at least one estimated parameter as computed for the immediately preceding iteration until the difference metric exceeds a specified threshold; and
once the difference metric exceeds a specified threshold, setting the frequency boundary to a value that is substantially equal to the value of the frequency boundary in the immediately preceding iteration.

18. The system of claim 15,
wherein at least one of the nested pipes has one or more collars located at one or more collar depths along the pipe;
wherein response signals are obtained for a plurality of measurement depths along the pipe; and
wherein the processing facility is configured to determine the boundaries from the obtained response signals by:
computing, for a plurality of trial times or trial frequencies, a differential response signal as a function of depth; and
setting a time boundary or a frequency boundary for at least one of the pipes to a trial time or trial frequency, among the plurality of trial times or trial frequencies, at which variations in a differential response magnitude substantially at the one or more collar depths of an immediately surrounding pipe commence.

19. The system of claim 18, wherein the processing facility is further configured to compute at least one estimated parameter for at least one of the pipes from a portion of the measured response signal or derived signal that ends at the time boundary or begins at the frequency boundary associated with the respective pipe.

20. A non-transitory machine-readable medium storing machine-executable instructions for processing one or more response signals measured in response to induction of Eddy currents in a plurality of nested pipes, wherein the instructions, when executed by a machine, cause the machine to:
- determine, one or more boundaries between a plurality of time slots or a plurality of frequency slots, wherein each of the time slots or frequency slots is associated with a respective one or more of the pipes based, at least in part, on a time-dependent or frequency-dependent input response signal, wherein determining the one or more boundaries comprises, for each of at least one of the pipes, iteratively comparing estimated parameters for the pipe based on a portion of the input response signal coinciding with a boundary value with estimated parameters for the pipe based on a portion of the input response signal coinciding with an incremented boundary value; and
- process at least one of the one or more measured response signals in accordance with the one or more boundaries.

\* \* \* \* \*